Oct. 19, 1937.  K. A. SEABROOKS  2,096,597
MIXER DRIVE
Filed Jan. 21, 1937   2 Sheets-Sheet 1
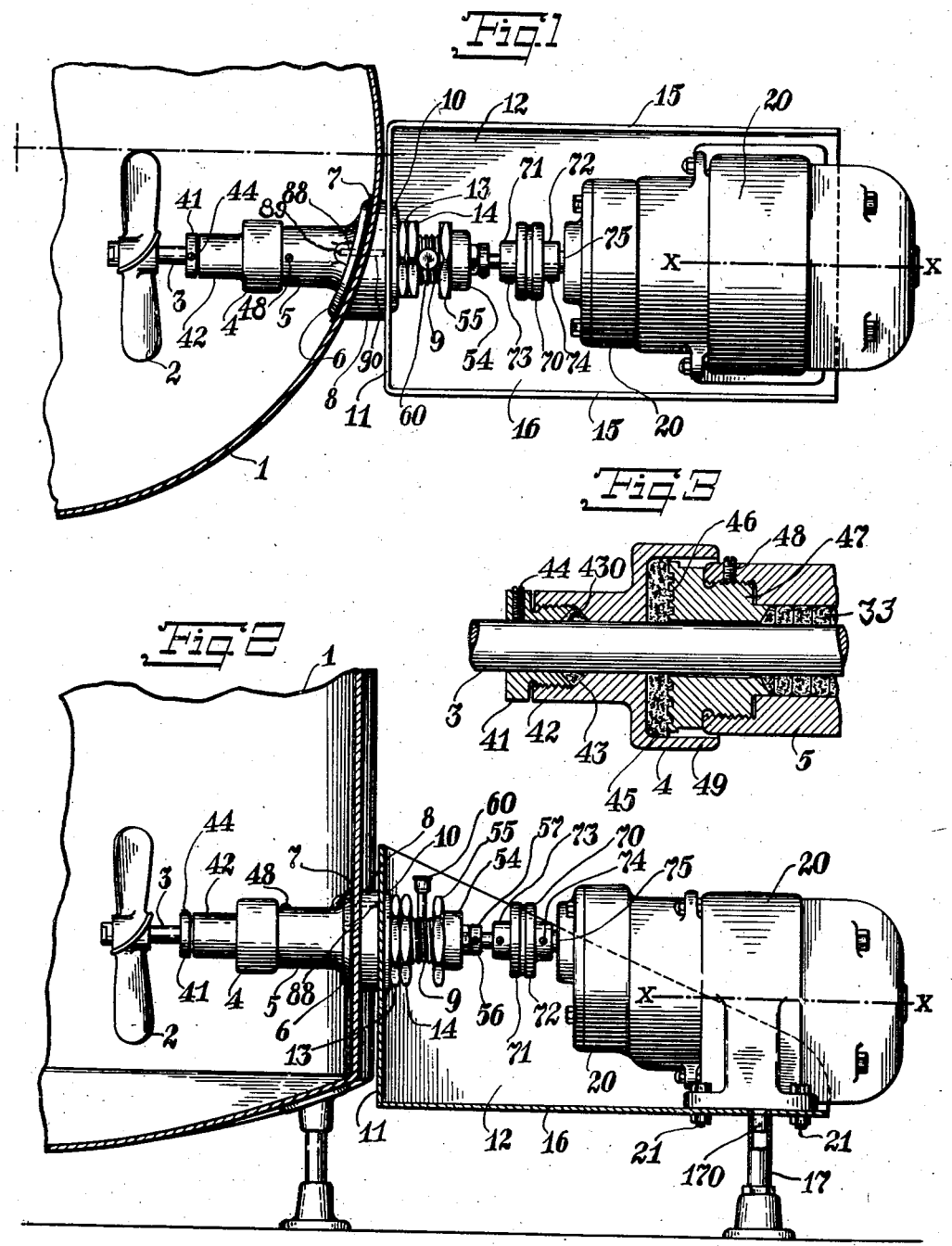
INVENTOR
Kyle A. Seabrooks
BY
C. Messick
ATTORNEY Oct. 19, 1937.  K. A. SEABROOKS  2,096,597
MIXER DRIVE
Filed Jan. 21, 1937    2 Sheets-Sheet 2
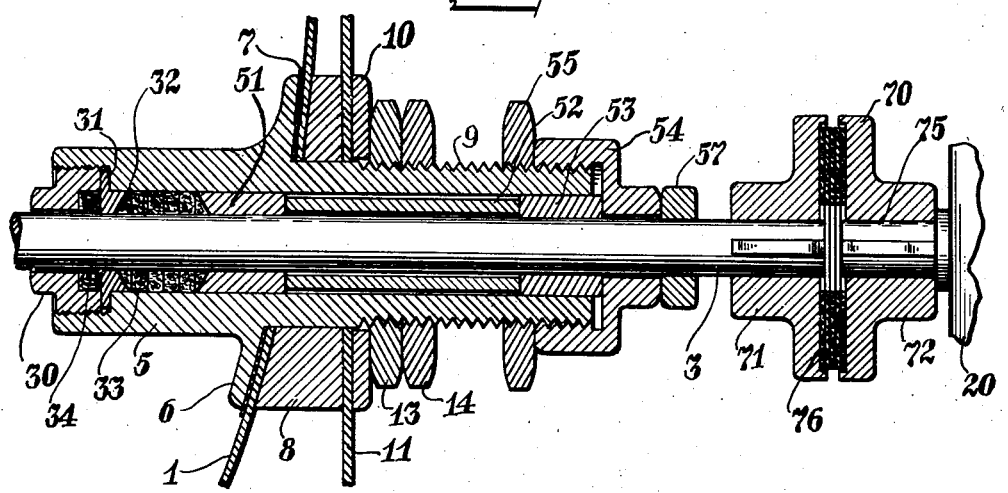
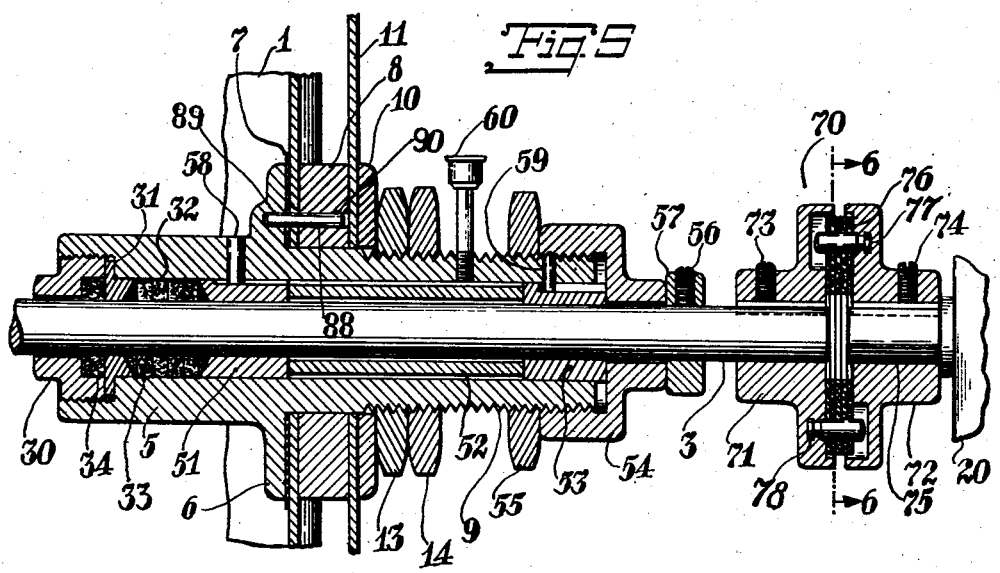
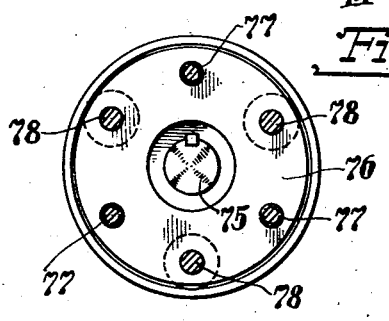
INVENTOR
Kyle A. Seabrooks
BY
C. Messick
ATTORNEY Patented Oct. 19, 1937

2,096,597

UNITED STATES PATENT OFFICE 2,096,597

MIXER DRIVE

Kyle A. Seabrooks, Rochester, N. Y., assignor to Mixing Equipment Company, Inc., Rochester, N. Y.

Application January 21, 1937, Serial No. 121,406

5 Claims. (Cl. 259—110)

This invention pertains to mixers and drives designed to operate same, generally, and particularly to the types of mixing devices which are positioned at, and enter a tank through a lower portion of its side wall. It also pertains to auxiliary end seals to exclude the grit in a gritty mix.

One object of this invention is to provide a self contained mixing unit which may be conveniently applied to any tank, with a minimum of installation expense, even though such tank was not originally designed to receive a mixer of the type contemplated by this invention.

Another object of this invention is to provide an improved frame for a mixer drive unit. Particularly one which may be supported at the edge of the hole through which the mixing shaft enters the side of a tank.

Another object is to provide a flexible coupling for such a mixer drive and particularly a flexible coupling for use in combination with a geared head motor, mixer drive.

Another object is to provide a combination of a frame, a geared head motor with slow speed shaft, eccentric or off set with relation to the longitudinal center axis of the motor, with the flexible coupling for driving a mixer shaft; said shaft being at an angle to any plane passing through the vertical center axis of a tank. The flexible coupling in this case particularly, and also in other cases where the motor drives the mixing shaft at motor speed, facilitating the installation of the device without the necessity for extreme precision of alignment between the coupled shafts.

Another object of the flexible coupling is to compensate for distortion of the alignment at the coupling due to change in shape of the tank when an empty tank is filled with heavy liquid.

Other objects consist in the improvement of the various factors themselves and/or combinations thereof, which will be pointed out in the appended claims.

Referring to the accompanying drawings,

Fig. 1 is a plan view of one of my mixer drives including an auxiliary end seal, a frame, a flexible coupling, a geared head motor, and associated parts. A conventional vertical tank, to which my invention may be applied is shown at the left of this figure.

Fig. 2 is a side view of the devices of Fig. 1.

Fig. 3 is an enlarged sectional view of the auxiliary end seal shown in operating condition near the mixing propeller member of Figs. 1 and 2.

Fig. 4 is a plan section of my mixer drive flexible coupling combination. In this figure the auxiliary end seal shown in Figs. 1, 2 and 3 is omitted and a conventional annular nut, to secure the end of a packing gland, is shown in place thereof.

Fig. 5 is a vertical section of the device of Fig. 4 and

Fig. 6 is a fragment of the flexible coupling taken on the line 6—6 of Fig. 5.

In Fig. 1 and Fig. 2 the numeral 1 indicates a tank having a mixing member, in this case a propeller 2, mounted on a mixer shaft 3, an auxiliary end seal 4, and a bearing and stuffing box assembly shell 5. The parts inside of members 4 and 5 will be subsequently described in detail. Shell 5 is provided with a curved bevel flange 6, designed and formed to fit the inside of tank 1 and beneath the flange 6 a soft washer 7 is shown, whereby a tight seal may be effected to prevent the egress of the mix contained in tank 1.

Shell 5 extends through a hole in the side wall of tank 1 as best shown in Figs. 4 and 5 and then through a curved bevel washer 8. A pin 88 is inserted in a blind hole 89 in member 6 and another blind hole 90 in member 8. It passes through member 7 and the wall of tank 1 so as to prevent members 6 and 8 rotating and getting out of position while being installed in tank 1. Washer 8 is designed to position the shell 5 with relation to the side wall of tank 1 as best shown in Figs. 1 and 2. In this position the blade tips of propeller 2 touch a diameter of tank 1 and the shaft 3 is parallel with said diameter. This position of the mixing propeller 2 has been found by past experience to be very effective. By the above described arrangements, the parts may be conveniently assembled in the desired position even in an old tank which was not originally equipped with this type of mixer and mixer drive.

Shell 5 extends beyond washer 8, to the right, at a threaded portion 9, which is provided with a flat washer 10. Washer 10 compresses and secures the left vertical end 11, of a frame 12 in fixed position with relation to tank 1, when the nut 13 and the lock nut 14 are tightened as shown in the figures. Frame 12 includes said end 11, sides 15—15 and a bottom 16, all of these members being preferably of sheet steel. Bottom 16 is provided with a centering lug 170 (see Fig. 2) to centre the upper end of a pipe strut or stanchion 17. The vertical load on bottom 16 is supported by the pipe stanchion 17 which extends down to a floor where it is adjustably secured in a stanchion base support fitting as shown best in Fig. 2. Stanchion 17 is merely centered at the bottom 16 by lug 170 and not rigidly attached. Thus the horizontal location of frame 12 is controlled by the above described member 5. Stanchion 17 merely supports and steadies the vertical load on member 16 after the parts have been assembled and positioned as above described. These several parts and a motor 20, which will be subsequently referred to more fully, are designed to be factory assembled as a complete unit. This unit may be shipped to a customer in a remote locality. Such a customer merely has to bore a hole in his tank which he may already have on hand and to adjust the unit in place. This can be done without machine shop facilities or highly skilled mechanics. The hole can, in fact, be cut with a circular cutter, and no great accuracy in its size is essential.

In Figs. 4 and 5 a modification is shown in which member 4 is omitted. In place of member 4 a conventional annular nut 30 is threaded into the left end of member 5. Member 30 holds in place an end plate 31 which forms the left end of a conventional gland or stuffing box 32, containing soft packing rings 33. Nut 30 also contains a soft washer 34 to aid in keeping out dirt from entering stuffing box 32 along the shaft 3.

Referring again to the auxiliary end seal 4 shown in Figs. 1 and 2 and particularly in Fig. 3, the end seal 4 includes a shell 42 containing a hard felt washer 45, tightly and immovably contained in a recess at the right hand end of shell 42. Shell 42 is slipped over shaft 3 and pushed to the right until felt washer 45 is forced into engagement with the concentric ridges 46, of an annular nut 47. Nut 47 (which replaces nut 30 above mentioned) is threaded into shell 5 and locked in place by set screw 48. The right end 49 of auxiliary end seal 4 overlaps member 5 to protect felt washer 45. The rotating engagement between members 45 and 46 effectively keeps out grit and prevents it from seeping along shaft 3 into said packing 33. Shell 42 is secured and sealed on shaft 3 by a soft metal ring casting 43, which is compressed against bevel 430 by a compressor nut 41. Nut 41 is locked in position by set screw 49 which engages shaft 3.

The parts which will now be described are similar in all the figures.

Referring particularly to Figs. 4 and 5:

Member 5 is cylindrically bored and the bore contains said packing 33 above mentioned, a bronze bushing or bearing member 51, which is slidable endways in said bore, a loosely fitting spacer or thrust tube 52 and another bronze bushing or bearing 53. At the right end of member 5 an adjustable threaded cap 54 is also provided and engages the external threaded portion 9 of member 5. The inside end plate portion of cap 54 bears against the right hand end of bushing or bearing 53. Tightening member 54 compresses members 53, 52, 51, and 33. Thus packing 33 may be adjustably compressed from the outside of tank 1. The adjustment may be locked by the operator wherever desired by tightening up lock nut 55. End play in shaft 3 may be limited by tightening up the set screw 56 in collar 57, best shown in Fig. 5.

Members 51 and 53 are grooved, as best shown in Fig. 5, and pins 58 and 59, which are fixed in member 5, respectively prevent said members 51 and 53 from rotating in the bore of member 5. A grease cup 60 is indicated extending through shell 5 to fill the space around member 52 with grease and lubricate members 51 and 53.

The right end of mixer shaft 3 is provided with a flexible coupling 70 comprising two similar die cast members 71 and 72. Member 71 is keyed and secured by a set screw 73 to shaft 3 and member 72 is keyed and secured by a set screw 74 to the slow speed shaft 75 of geared head motor 20.

Geared head motor 20 is secured by bolts 21 to the bottom member 16 of frame 12 previously described.

Between the said members 71 and 72 of flexible coupling 70 there is positioned a leather or rubber disc 76 best shown in Fig. 6. The disc 76 is driven by three pins 77, projecting from member 72, and disc 76 drives three pins 78 projecting from member 71. This flexible coupling in itself is conventional but performs two functions instead of one as in ordinary practice, for it facilitates the convenient coupling, or uncoupling, when desired, of shafts 3 and 75 and also compensates for small eccentricity and changes in the relative positions of said shafts due to distortion of tank 1 when heavily loaded with a mix.

In Figs. 1 and 2 the longitudinal centre axis of motor 20 is indicated by the dot and dash line X—X. It may be observed that by the arrangement of the motor, with the axis X—X below and eccentric to that of shaft 3, the various parts are very accessible, also the centre of gravity of the motor is low, both of which are valuable practical considerations. The speed range of this type of geared head motor is found well suited to efficient mixing and when combined with the factors above described provides a highly efficient mixer drive.

I do not limit myself to the exact construction above described as a typical embodiment of my invention, the scope of which will be pointed out in the appended claims.

I claim:

1. In a mixer drive device for a tank, a motor supporting frame including a substantially horizontal portion and a substantially vertical end portion extending upwardly therefrom, there being holes for motor securing bolts, in said horizontal portion, whereby a motor may be mounted upon an upper surface thereof, there being a large hole in said vertical end portion, having its axis in predetermined relation to said surface and said bolt holes, of a diameter whereby a combined bearing and stuffing box means of corresponding diameter and provided with clamping means may be accommodated, and whereby, when such a bearing and stuffing box means is inserted through said large hole and through a corresponding large hole in the side of said tank, and tightened up, such tank, bearing and stuffing box means, and said surface and bolt holes, will be thereby clamped into fixed, cooperative positions, in relation to each other.

2. In a mixer drive device for a tank, a motor supporting frame including a substantially horizontal portion and a substantially vertical end portion extending upwardly therefrom, there being holes for motor securing bolts, in said horizontal portion, designed to secure a motor provided with a slow speed shaft and mounting half of a flexible coupling at the end thereof, supported upon an upper surface of said horizontal portion; said motor being designed to be secured in place by means of bolts, in said holes, there being a large hole in said vertical end portion, having its axis in line with said slow speed shaft, a combined bearing and stuffing box means, provided with clamping means, mounted in said large hole and designed to receive a revolubly mounted mixing shaft; said mixing shaft being designed to be provided at its outer end with a matching half for said half flexible coupling; said bearing and stuffing box means being designed to engage a tank having a side, provided with a corresponding large hole in said side; such a tank, said frame and said bearing and stuffing box means being designed to be clamped by said clamping means into fixed, cooperative positions, in relation to each other, whereby said two half flexible couplings will normally engage each other in driving relation but permit easy disengagement, without disturbing the assembly of said frame, said bearing and stuffing box means, and said tank.

3. In a mixer drive device for a tank, a motor supporting frame including a substantially horizontal portion and a substantially vertical end portion extending upwardly therefrom, there being holes for motor securing bolts, in said horizontal portion, designed to secure a motor provided with a slow speed shaft and mounting half of a flexible coupling at the end thereof, supported upon an upper surface of said horizontal portion, there being a large hole in said vertical end portion, having its axis in line with said slow speed shaft, a combined bearing and stuffing box means, provided with clamping means, mounted in said large hole, and a mixing shaft therein; said mixing shaft being provided at its outer end with a matching half for said half flexible coupling; said bearing and stuffing box means being designed to engage a tank having a side, provided with a corresponding large hole in said side; such a tank, said frame and said bearing and stuffing box means being designed to be clamped by said clamping means into fixed, cooperative positions, in relation to each other, whereby said two half flexible couplings will normally engage each other in driving relation but permit easy disengagement, without disturbing the assembly of said frame, said bearing and stuffing box means, and said tank.

4. In a mixer drive device for a tank, a motor supporting frame including a substantially horizontal portion and a substantially vertical end portion extending upwardly therefrom, there being holes for motor securing bolts, in said horizontal portion, a motor provided with a slow speed shaft and mounting half of a flexible coupling at the end thereof, supported upon an upper surface of said horizontal portion, bolts securing said motor in place, in said holes, there being a large hole in said vertical end portion, having its axis in line with said slow speed shaft, a combined bearing and stuffing box means, provided with clamping means, mounted in said large hole, and a mixing shaft therein; said mixing shaft being provided at its outer end with a matching half for said half flexible coupling; said bearing and stuffing box means being designed to engage a tank having a side, provided with a corresponding large hole in said side; such a tank, said frame and said bearing and stuffing box means being designed to be clamped by said clamping means into fixed, cooperative positions, in relation to each other, whereby said two half flexible couplings will normally engage each other in driving relation but permit easy disengagement, without disturbing the assembly of said frame, said bearing and stuffing box means, and said tank.

5. In a mixer drive device for a tank, a motor supporting frame including a substantially horizontal portion and a substantial vertical end portion extending upwardly therefrom, there being holes for motor securing bolts, in said horizontal portion, a motor provided with a slow speed shaft and mounting half of a flexible coupling at the end thereof, supported upon an upper surface of said horizontal portion, bolts securing said motor in place, in said holes, there being a large hole in said vertical end portion, having its axis in line with said slow speed shaft, a combined bearing and stuffing box means, provided with clamping means, mounted in said large hole, and a mixing shaft therein; said mixing shaft being provided at its outer end with a matching half for said half flexible coupling, a tank having a side, provided with a corresponding large hole in said side; said frame, tank, and bearing and stuffing box means being clamped by said clamping means into fixed, cooperative positions, in relation to each other, whereby said two half flexible couplings will normally engage each other in driving relation but permit easy disengagement, without disturbing the assembly of said frame, said bearing and stuffing box means, and said tank.

KYLE A. SEABROOKS.